United States Patent
Nakazumi et al.

(10) Patent No.: US 12,546,959 B2
(45) Date of Patent: Feb. 10, 2026

(54) OPTICAL APPARATUS, LIGHT SOURCE APPARATUS, AND OPTICAL FIBER LASER

(71) Applicant: FURUKAWA ELECTRIC CO., LTD., Tokyo (JP)

(72) Inventors: Masaya Nakazumi, Tokyo (JP); Naoki Hayamizu, Tokyo (JP); Yuta Ishige, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 242 days.

(21) Appl. No.: 18/364,712

(22) Filed: Aug. 3, 2023

(65) Prior Publication Data

US 2023/0375791 A1   Nov. 23, 2023

Related U.S. Application Data

(63) Continuation of application No. PCT/JP2022/004337, filed on Feb. 3, 2022.

(30) Foreign Application Priority Data

Feb. 5, 2021   (JP) ................................. 2021-017163

(51) Int. Cl.
*G02B 6/42* (2006.01)
*H01S 5/00* (2006.01)
(Continued)

(52) U.S. Cl.
CPC ......... *G02B 6/4214* (2013.01); *G02B 6/4204* (2013.01); *G02B 6/424* (2013.01);
(Continued)

(58) Field of Classification Search
CPC .... G02B 6/424; G02B 6/4214; G02B 6/4204; G02B 6/4268; H01S 5/4031;
(Continued)

(56) References Cited

U.S. PATENT DOCUMENTS

2003/0142720 A1* 7/2003 Bradburn ............ H01S 5/02325
                                                           359/641
2016/0181762 A1   6/2016 Dawson et al.
(Continued)

FOREIGN PATENT DOCUMENTS

CN   109314363 A   2/2019
CN   109565154 A   4/2019
(Continued)

OTHER PUBLICATIONS

International Search Report issued Mar. 22, 2022 in PCT/JP2022/004337 filed on Feb. 3, 2022, 3 pages.
(Continued)

*Primary Examiner* — Michael P Mooney
(74) *Attorney, Agent, or Firm* — Oblon, McClelland, Maier & Neustadt, L.L.P.

(57) ABSTRACT

An optical apparatus includes: a base; a light emitting element arranged on the base and configured to output laser light; a plurality of optical components arranged on the base and configured to guide the laser light output from the light emitting element to an optical fiber, and couple the laser light with the optical fiber; and a shielding unit arranged on the base and configured to block stray light deviated from a predetermined optical path in a first optical component as the optical component and traveling to a second optical component as the optical component, and reflect the stray light in a direction deviating from the first optical component.

17 Claims, 12 Drawing Sheets

(51) Int. Cl.
*H01S 5/02251* (2021.01)
*H01S 5/02253* (2021.01)

(52) U.S. Cl.
CPC ............ *G02B 6/4268* (2013.01); *H01S 5/005* (2013.01); *H01S 5/02251* (2021.01); *H01S 5/02253* (2021.01)

(58) Field of Classification Search
CPC .. H01S 5/02253; H01S 5/005; H01S 5/02325; H01S 5/4012; H01S 5/02251
See application file for complete search history.

(56) References Cited

U.S. PATENT DOCUMENTS

| | | | |
|---|---|---|---|
| 2016/0282174 A1* | 9/2016 | Hasegawa | G01J 1/0204 |
| 2017/0358900 A1* | 12/2017 | Kanskar | H01S 5/02469 |
| 2018/0231724 A1* | 8/2018 | Ishige | G02B 6/4237 |
| 2018/0284365 A1 | 10/2018 | Katayama et al. | |
| 2019/0020178 A1 | 1/2019 | Oguri et al. | |
| 2019/0157835 A1* | 5/2019 | Ishige | H01S 3/06754 |
| 2020/0366053 A1* | 11/2020 | Yamaoka | H01S 5/0064 |

FOREIGN PATENT DOCUMENTS

| | | |
|---|---|---|
| JP | 2004-6641 A | 1/2004 |
| JP | 2016-181645 A | 10/2016 |
| WO | WO 2017/099056 A1 | 6/2017 |
| WO | WO 2017/134911 A1 | 8/2017 |
| WO | WO 2018/043752 A1 | 3/2018 |
| WO | WO 2018/051430 A1 | 3/2018 |
| WO | WO 2019/160001 A1 | 8/2019 |

OTHER PUBLICATIONS

Chinese Office Action dated Sep. 16, 2025 in Chinese Application No. 202280013074.1, with English translation of the cover page and English machine translation of the main body thereof, citing refs. 1 and 2, 24 pages.

\* cited by examiner

OPTICAL APPARATUS, LIGHT SOURCE APPARATUS, AND OPTICAL FIBER LASER

This application is a continuation of International Application No. PCT/JP2022/004337, filed on Feb. 3, 2022 which claims the benefit of priority of the prior Japanese Patent Application No. 2021-017163, filed on Feb. 5, 2021, the entire contents of which are incorporated herein by reference.

BACKGROUND

The present disclosure relates to an optical apparatus, a light source apparatus, and an optical fiber.

In the related art, an optical apparatus that includes a processing unit for processing stray light (leaked light) that is light deviating from a predetermined optical path is known (for example, International Publication No. WO/2017/134911).

SUMMARY

As in the optical apparatus described in International Publication No. WO/2017/134911, in this type of optical apparatus, it is important to prevent an adverse effect due to stray light.

There is a need for an optical apparatus, a light source apparatus, and an optical fiber laser with an improved and novel configuration that makes it possible to prevent an adverse effect due to stray light.

According to one aspect of the present disclosure, there is provided an optical apparatus including: a base; a light emitting element arranged on the base and configured to output laser light; a plurality of optical components arranged on the base and configured to guide the laser light output from the light emitting element to an optical fiber, and couple the laser light with the optical fiber; and a shielding unit arranged on the base and configured to block stray light deviated from a predetermined optical path in a first optical component as the optical component and traveling to a second optical component as the optical component, and reflect the stray light in a direction deviating from the first optical component.

According to another aspect of the present disclosure, there is provided an optical apparatus including: a plurality of optical components configured to guide laser light to an optical fiber, and couple the laser light with the optical fiber; and a shielding unit configured to block stray light that has deviated from a predetermined optical path in the optical component, and reflect the stray light in a direction away from the optical component.

DETAILED DESCRIPTION

Exemplary embodiments and modifications will be disclosed below. Configurations of the embodiments and the modifications described below and operation and results (effects) achieved by the configurations are one example. The present disclosure may be embodied by configurations other than the configurations disclosed in the embodiments and the modifications below. Further, according to the present disclosure, it is possible to achieve at least one of various effects (including derivative effects) achieved by the configurations.

The plurality of embodiments and modifications described below have the same configurations. Therefore, according to the configuration of each of the embodiments and the modifications described below, it is possible to achieve the same operation and effects based on the same configuration. Furthermore, in the following, the same components are denoted by the same reference symbols, and repeated explanation may be omitted in some cases.

In the present specification, ordinal numbers are assigned, for the sake of convenience, to distinguish components, regions, directions, and the like, but do not indicate priority or order.

Furthermore, in each of the drawings, an X1 direction is indicated by an arrow X1, an X2 direction is indicated by an arrow X2, a Y direction is indicated by an arrow Y, and a Z direction is indicated by an arrow Z. The X1 direction, the Y direction, and the Z direction cross one another and are perpendicular to one another. Moreover, the X1 direction and the X2 direction are opposite directions.

Meanwhile, in FIGS. 1, 3, 8, and 10 to 12, optical paths of laser light L are indicated by bold arrows.

Figure 1:
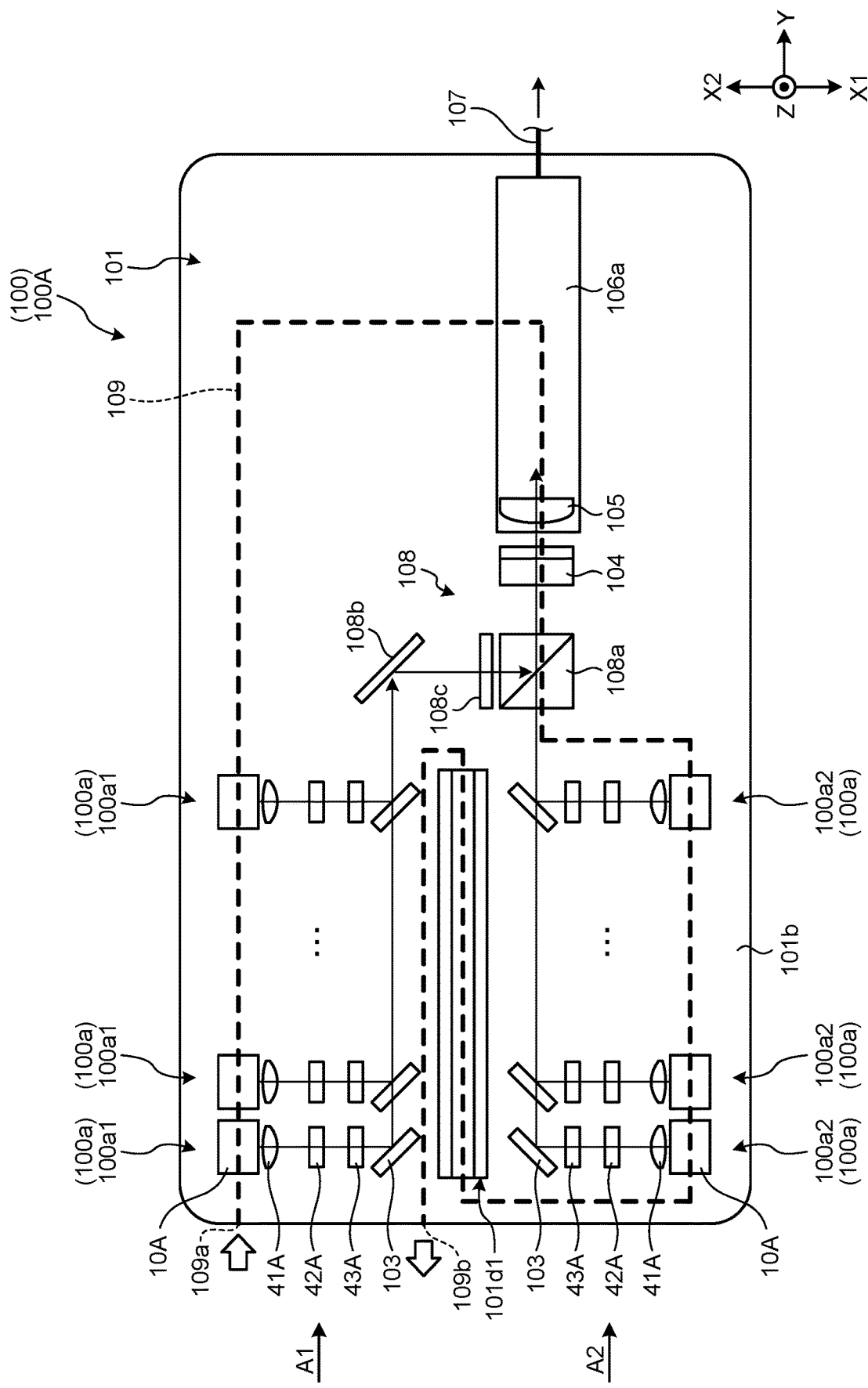
FIG. 1 is an exemplary and schematic plan view of an optical apparatus of a first embodiment.

FIG. 1 is an overall configuration diagram of an optical apparatus 100A (100) of a first embodiment, and is a plan view of an inside of the optical apparatus 100A viewed in an opposite direction of the Z direction.

As illustrated in FIG. 1, the optical apparatus 100A includes a base 101, a plurality of subunits 100a, a light synthesis unit 108, condenser lenses 104 and 105, and an optical fiber 107. Laser light that is emitted from a light emitting module 10A of each of the subunits 100a is transmitted to an end portion (not illustrated) of the optical fiber 107 via a mirror 103 of each of the subunits 100a, the light synthesis unit 108, and the condenser lenses 104 and 105, and is optically coupled with the optical fiber 107. The optical apparatus 100A may also be referred to as a light emitting apparatus.

The base 101 is made of, for example, a material with high thermal conductivity, such as a copper material or an aluminum material. The base 101 may be configured with a single component or a plurality of components. Further, the base 101 is covered by a cover (not illustrated). The plurality of subunits 100a, the plurality of mirrors 103, the light synthesis unit 108, the condenser lenses 104 and 105, and the end portion of the optical fiber 107 are arranged on the base 101 and housed in a housing chamber (not illustrated) that is formed between the base 101 and the cover. The housing chamber is hermetically sealed.

The optical fiber 107 is an output optical fiber and is fixed to the base 101 via a fiber support unit 106a that supports the end portion of the optical fiber 107.

The fiber support unit 106a may be configured as a part of the base 101 and integrated with the base 101, or the fiber support unit 106a that is configured as a member separate from the base 101 may be attached to the base 101 via a fixture, such as a screw, for example.

Each of the subunits 100a includes the light emitting module 10A that outputs laser light, a plurality of lenses 41A to 43A, and the mirror 103. The lenses 41A to 43A and the mirror 103 are examples of an optical component. The lenses 42A and 43A collimate the laser light on a fast axis and a slow axis.

Further, the optical apparatus 100A includes two arrays A1 and A2 in each of which the plurality of subunits 100a are arranged at predetermined intervals in the Y direction. In a subunit 100a1 (100a) of the array A1, the light emitting module 10A outputs laser light in the X1 direction, the lenses 41A to 43A transmit the laser light coming from the light emitting module 10A in the X1 direction, and the mirror 103 reflects the laser light traveling in the X1 direction toward the Y direction. In a subunit 100a2 (100a) of the array A2, the light emitting module 10A outputs laser light in the X2 direction, the lenses 41A to 43A transmit the laser light coming from the light emitting module 10A in the X2 direction, and the mirror 103 reflects the laser light traveling in the X2 direction toward the Y direction. The subunit 100a1 is one example of a first subunit and the subunit 100a2 is one example of a second subunit. Furthermore, the X1 direction is one example of a first direction and the X2 direction is one example of an opposite direction of the first direction.

In the present embodiment, the subunit 100a1 of the array A1 and the subunit 100a2 of the array A2 are aligned in the X1 direction (the X2 direction). When the subunit 100a1 and the subunit 100a2 are aligned in the X1 direction, for example, a size of the optical apparatus 100A in the Y direction is further reduced, which is an advantage. However, the embodiments are not limited to this example, and the subunit 100a1 and the subunit 100a2 may be deviated from each other. For example, each of the subunits 100a2 may be arranged in the X1 direction at a gap between the two subunits 100a1 that are adjacent to each other in the Y direction.

Figure 2:
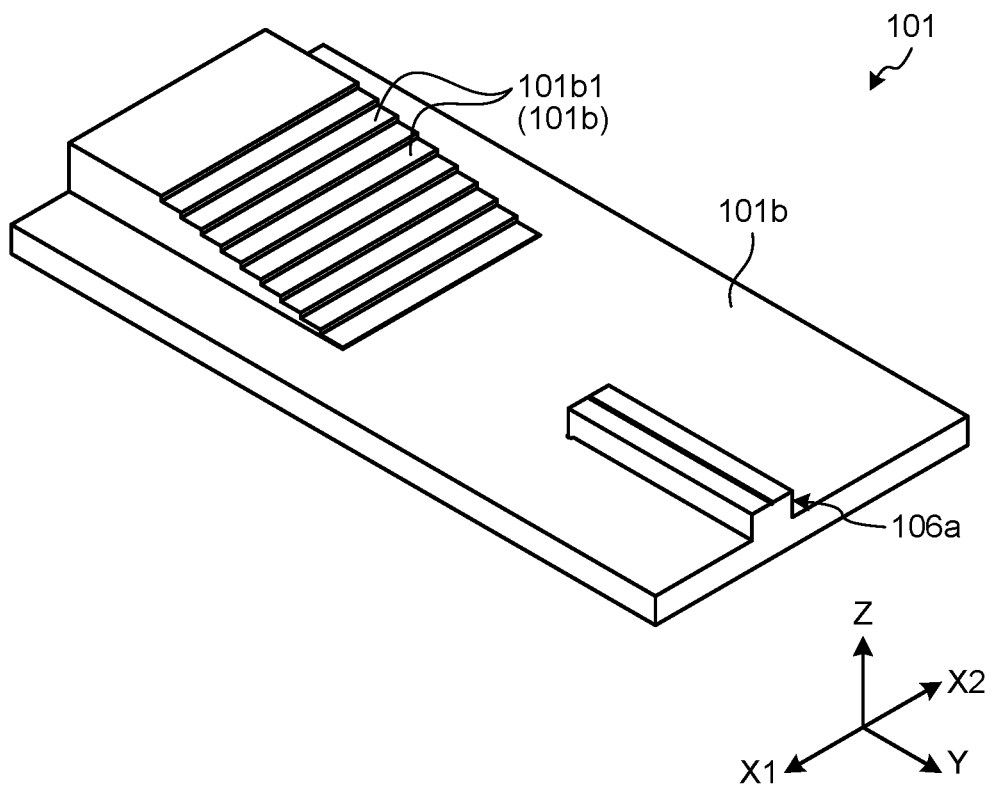
FIG. 2 is an exemplary and schematic perspective view of a base included in the optical apparatus of the first embodiment.

FIG. 2 is a perspective view of the base 101. As illustrated in FIG. 2, a plurality of steps 101b1 are arranged on a top surface 101b of the base 101 such that positions of the subunits 100a deviate in the opposite direction of the Z direction along the Y direction. In each of the arrays A1 and A1 in which the plurality of subunits 100a are arranged at predetermined intervals (for example, regular intervals) in the Y direction, the subunits 100a are arranged on the respective steps 101b1. Therefore, the positions of the subunits 100a in the Z direction in the array A1 deviate in the opposite direction of the Z direction along the Y direction, and the positions of the subunits 100a in the Z direction in the array A2 also deviate in the opposite direction of the Z direction along the Y direction. With this configuration, in each of the arrays A1 and A2, it is possible to input, from the plurality of mirrors 103, a plurality of beams of laser light that travel in the Y direction and that are parallel to each other in the Z direction. Meanwhile, the steps 101b1 may be configured so as to deviate in a direction inclined to the Y direction or inclined to an opposite direction of the Y direction with respect to the Z direction such that the laser light travels from each of the mirrors 103 in a direction with a predetermined elevation angle with respect to the Y direction.

As illustrated in FIG. 1, the laser light that travels from each of the mirrors 103 is input to the light synthesis unit 108 and synthesized by the light synthesis unit 108.

The light synthesis unit 108 includes a combiner 108a, a mirror 108b, and a half-wave plate 108c. The combiner 108a, the mirror 108b, and the half-wave plate 108c are examples of the optical component.

The mirror 108b causes the laser light coming from the subunits 100a of the array A1 to travel toward the combiner 108a via the half-wave plate 108c. The half-wave plate 108c rotates a plane of polarization of light coming from the array A1.

The laser light coming from the subunits 100a of the array A2 is directly input to the combiner 108a.

The combiner 108a combines laser light coming from the two arrays A1 and A2. The combiner 108a may also be referred to as a polarization combining element.

The laser light coming from the combiner 108a is collected by the condenser lenses 104 and 105 toward the end portion (not illustrated) of the optical fiber 107, optically coupled with the optical fiber 107, and transmitted inside the optical fiber 107. The condenser lenses 104 and 105 are examples of the optical component.

Further, a refrigerant passage 109 that cools the subunits 100a (the light emitting modules 10A), the fiber support unit 106a, the condenser lenses 104 and 105, the combiner 108a, a shielding unit 101d1 (to be described later), and the like are arranged in the base 101. In the refrigerant passage 109, for example, a refrigerant, such as a coolant, flows. The refrigerant passage 109 is extended near a mounting surface of each of the components on the base 101, such as just below or in the vicinity of the mounting surface, and an inner surface of the refrigerant passage 109 and a refrigerant (not illustrated) in the refrigerant passage 109 are thermally connected to cooling target components and regions, that is, the subunits 100a (the light emitting modules 10A), the fiber support unit 106a, the condenser lenses 104 and 105, the combiner 108a, and the like. Heat exchange is performed between the refrigerant and the components or the regions via the base 101, so that the components are cooled. Meanwhile, an inlet 109a and an outlet 109b of the refrigerant passage 109 are arranged on an end portion of the base 101 in the opposite direction of the Y direction as one example, but may be arranged at different positions.

Subunit

Figure 3:
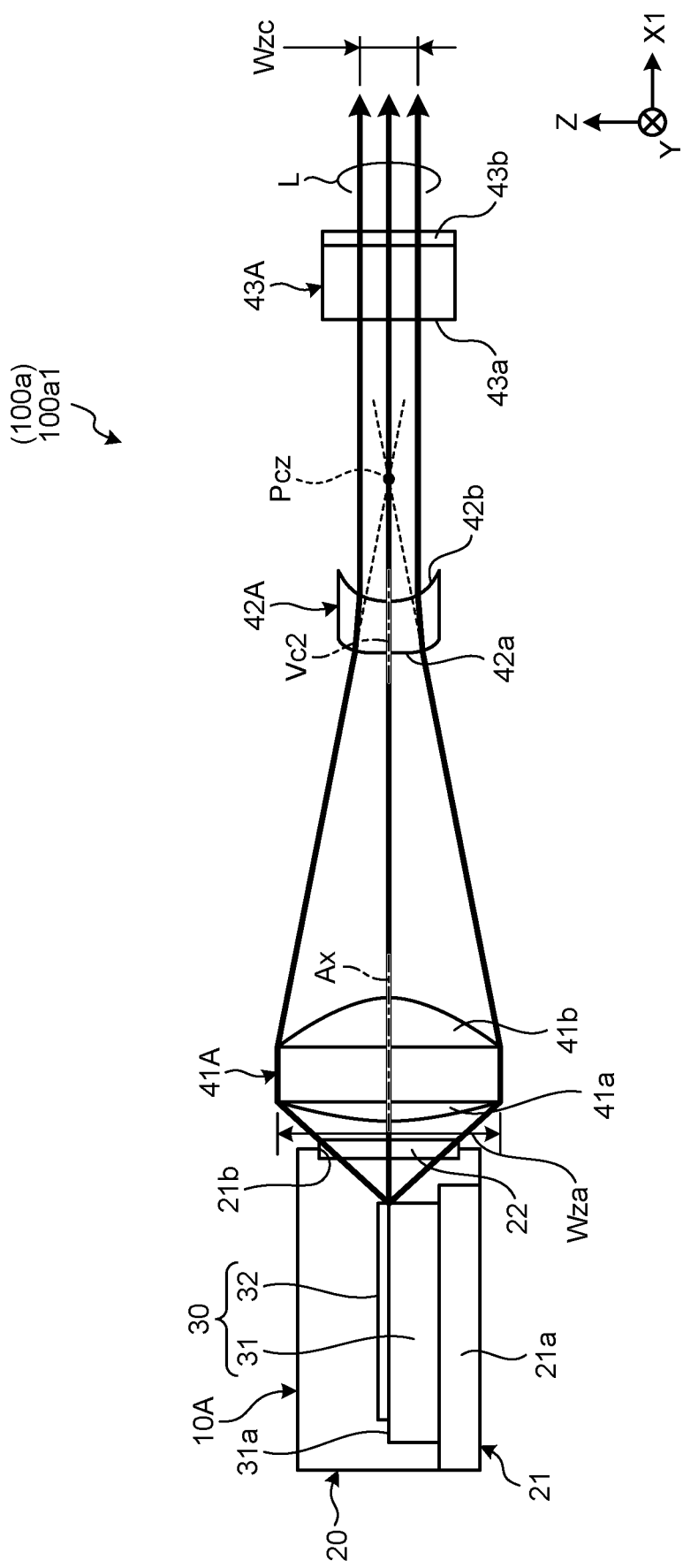
FIG. 3 is an exemplary and schematic side view of a subunit included in the optical apparatus of the first embodiment.

FIG. 3 is a side view illustrating a configuration of the subunit 100a1 (100a) of the array A1. Meanwhile, the subunit 100a2 of the array A2 has the same configuration as the subunit 100a1 except that the arrangement of the optical components and a transmission direction of the laser light are opposite to those of the subunit 100a1.

The light emitting module 10A includes a chip-on-surmount 30 and a case 20 that houses the chip-on-submount 30. Meanwhile, in FIG. 3, the light emitting module 10A is illustrated such that an inside of the case 20 is viewed in a perspective manner.

The case 20 is a rectangular box and houses the chip-on-submount 30. The case 20 includes a wall member 21 and a window member 22. The wall member 21 is made of, for example, a metal material.

Further, the case 20 includes a base 21a. The base 21a has a plate shape that crosses the Z direction. The base 21a is, for example, a part (bottom wall) of the wall member 21. The base 21a is made of, for example, a meatal material with high thermal conductivity, such as oxygen-free copper. The oxygen-free copper is one example of a copper material. Meanwhile, the base 21a may be arranged separately from the wall member 21.

An opening portion 21b is arranged on an end portion of the wall member 21 in the X1 direction. The window member 22 that transmits the laser light L is attached to the opening portion 21b. The window member 22 crosses and is perpendicular to the X1 direction. The laser light L that is emitted from the chip-on-submount 30 in the X1 direction passes through the window member 22 and is output to the outside of the light emitting module 10A. The laser light L is emitted from the light emitting module 10A in the X1 direction.

Boundary portions between a plurality of members (not illustrated) included in the wall member 21 (the case 20) and a boundary portion between the wall member 21 and the window member 22 are sealed to prevent transmission of gas. In other words, the case 20 is hermetically sealed. Meanwhile, the window member 22 is also a part of the wall member 21.

The chip-on-submount 30 includes a submount 31 and a light emitting element 32. The chip-on-submount 30 may also be referred to as a semiconductor laser module.

The submount 31 has, for example, a plate shape that crosses and is perpendicular to the Z direction. The submount 31 is made of, for example, an insulating material with relatively high thermal conductivity, such as aluminum nitride, ceramic, or glass. A metallization layer 31a as an electrode for supplying power to the light emitting element 32 is formed on the submount 31.

The submount 31 is mounted on the base 21a. The light emitting element 32 is mounted on a top surface of the submount 31. In other words, the light emitting element 32 is mounted on the base 21a via the submount 31, and mounted on the base 101 via the submount 31 and the case 20.

The light emitting element 32 is, for example, a semiconductor laser device that has a fast axis (FA) and a slow axis (SA). The light emitting element 32 has an elongated shape that extends in the X1 direction. The light emitting element 32 emits, in the X1 direction, the laser light L from an emission opening (not illustrated) that is arranged on an end portion in the X1 direction. The chip-on-submount 30 is mounted such that the fast axis of the light emitting element 32 extends along the Z direction and the slow axis extends along the Y direction. The Z direction is one example of a fast axis direction, and the Y direction is one example of a slow axis direction.

The laser light L that is emitted from the light emitting element 32 travels through the lens 41A, the lens 42A, and the lens 43A in this order, and is collimated in at least the Z direction and the Y direction. All of the lens 41A, the lens 42A, and the lens 43A are arranged outside the case 20.

In the present embodiment, the lens 41A, the lens 42A, and the lens 43A are arranged in this order in the X1 direction. The laser light L that is emitted from the light emitting element 32 transmits through the lens 41A, the lens 42A, and the lens 43A in this order. Further, while the laser light L is emitted from the light emitting element 32 and transmits through the lens 41A, the lens 42A, and the lens 43A, an optical axis of the laser light L extends in a linear manner, the fast axis direction of the laser light L extends along the Z direction, and the slow axis direction of the laser light L extends along the Y direction.

The lens 41A is slightly separated from the window member 22 in the X1 direction or comes into contact with the window member 22 in the X1 direction.

The laser light that has transmitted through the window member 22 enters the lens 41A. The lens 41A is a lens that has an axisymmetric shape with respect to a central axis Ax that extends along the optical axis, and is configured as a rotating body around the central axis Ax. The lens 41A is arranged such that the central axis Ax extends along the X1 direction and overlaps with the optical axis of the laser light L. Each of an incidence surface 41a and an emission surface 41b of the lens 41A has a plane of rotation around the central axis Ax that extends in the X1 direction. The emission surface 41b is a convex surface that protrudes in the X1 direction. The emission surface 41b largely protrudes relative to the incidence surface 41a. The lens 41A is what is called a convex lens.

A beam width of the laser light L that is output from the lens 41A is reduced along the X1 direction. Meanwhile, the beam width is a width of a range in which light intensity is equal to or larger than a predetermined value in a beam profile of the laser light. The predetermined value is, for example, $1/e^2$ of peak light intensity. The lens 41A condenses the laser light L in the Z direction, in the Y direction, and a direction between the Z direction and the Y direction, so that it is possible to achieve an effect to reduce aberration of the laser light L.

The lens 42A has a plane symmetrical shape with respect to a virtual central plane Vc2 as a plane that crosses and is perpendicular to the Z direction. Each of an incidence surface 42a and an emission surface 42b of the lens 42A has a cylindrical surface that has a generating line extending along the Y direction and that extends in the Y direction. The incidence surface 42a is a convex surface that protrudes in the opposite direction of the X1 direction. Further, the emission surface 42b is a concave surface that is recessed in the X1 direction.

The lens 42A collimates the laser light L in the Z direction, that is, in the fast axis direction, such that a beam width Wzc in the Z direction is reduced as compared to a beam width Wza in the Z direction at the incidence surface 41a of the lens 41A. The lens 42A is a concave lens at a cross section perpendicular to the Y direction. The lens 42A may also be referred to as a collimator lens.

Further, the lens 42A is located closer to the lens 41A relative to a convergent point Pcz at which the laser light L is converged by the lens 41A in the Z direction. If the lens 42A is located away from the lens 41A relative to the convergent point Pcz in the Z direction, the convergent point Pcz in the Z direction appears on the optical path of the laser light L between the lens 41A and the lens 42A. This may cause inconvenience such that dust is accumulated at the convergent point Pcz in the Z direction at which energy density is high. In this regard, in the present embodiment, the lens 42A is located closer to the lens 41A relative to the convergent point Pcz in the Z direction, so that the laser light L is collimated by the lens 42A before arriving at the convergent point Pcz. In other words, according to the present embodiment, the convergent point Pcz in the Z direction does not appear on the optical path of the laser light L, so that it is possible to prevent inconvenience caused by the convergent point Pcz.

Meanwhile, a convergent point (not illustrated) of the laser light L in the Y direction appears between the lens 41A and the lens 42A, but energy density at the convergent point in the Y direction is not relatively high, so that a problem with accumulation of dust is less likely to occur.

A beam width of the laser light L, which has emitted from the light emitting element 32 and transmitted through the lens 41A and the lens 42A, in the Y direction increases along the X1 direction. The flared laser light L that is flared in the Y direction enters the lens 43A through the lens 42A.

The lens 43A has a plane symmetrical shape with respect to a virtual central plane as a plane that crosses and is perpendicular to the Y direction. Each of an incidence surface 43$a$ and an emission surface 43$b$ of the lens 43A has a cylindrical surface that has a generating line extending along the Z direction and that extends in the Z direction. The incidence surface 43$a$ is a plane that is perpendicular to the X1 direction. Further, the emission surface 43$b$ is a convex surface that protrudes in the X1 direction.

The lens 43A collimates the laser light L in the Y direction, that is, in the slow axis. The lens 43A is a convex lens at a cross section perpendicular to the Z direction. The lens 43A may also be referred to as a collimator lens.

As illustrated in FIG. 1, if the laser light in the subunit 100$a$1 of the array A1 and the laser light in the subunit 100$a$2 of the array A2 travel in opposite directions, in the subunit 100$a$ in one of the arrays A1 and A2, stray light (leaked light) of the laser light that travels in a direction approaching the other one of the arrays A1 and A2 may interfere with the laser light in the subunit 100$a$ in the other one of the arrays A1 and A2. Further, when the lenses 41A to 43A are bonded to the base 101 via a bonding member (not illustrated), and if the stray light is applied to the bonding member, the bonding member may be damaged. The stray light comes from laser light that has deviated from a predetermined optical path due to unintentional reflection at or unintentional transmission through each of the optical components, for example.

To cope with this, in the present embodiment, the shielding unit 101$d$1 that blocks the stray light is arranged between the array A1 and the array A2. The shielding unit 101$d$1 blocks stray light traveling from the lenses 41A to 43A and the mirror 103 of the subunit 100$a$1 to the lenses 41A to 43A and the mirror 103 of the subunit 100$a$2 in the X1 direction, and reflects the stray light in a direction deviating from the lenses 41A to 43A and the mirror 103 of the subunit 100$a$1. Further, the shielding unit 101$d$1 blocks stray light traveling from the lenses 41A to 43A and the mirror 103 of the subunit 100$a$2 to the lenses 41A to 43A and the mirror 103 of the subunit 100$a$1 in the X2 direction, and reflects the stray light in a direction deviating from the lenses 41A to 43A and the mirror 103 of the subunit 100$a$2. The lenses 41A to 43A and the mirror 103 included in the subunit 100$a$1 are examples of a first optical component, and the lenses 41A to 43A and the mirror 103 included in the subunit 100$a$2 are examples of a second optical component. Furthermore, the X1 direction is one example of the first direction and the X2 direction is one example of the opposite direction of the first direction.

Figure 4:
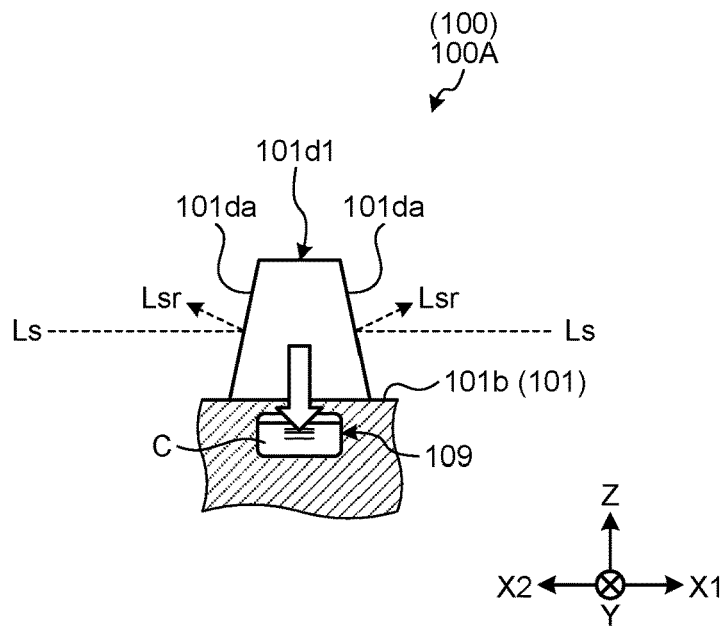
FIG. 4 is an exemplary and schematic side view (partial cross-sectional view) of a part including a shielding unit of the optical apparatus of the first embodiment.

FIG. 4 is a side view of the shielding unit 101$d$1. The shielding unit 101$d$1 protrudes from the top surface 101$b$ in the Z direction. A position of a top portion of the shielding unit 101$d$1 in the Z direction, that is, a height from the top surface 101$b$, is set to a certain height that is enough to block stray light Ls that is indicated by a dashed arrow. For example, the position of the top portion of the shielding unit 101$d$1 in the Z direction is located at at least the same position of a top portion of each of the lenses 41A to 43A included in the subunit 100$a$ in the Z direction or located ahead of the top portion of each of the lenses 41A to 43A in the Z direction.

The shielding unit 101$d$1 may be mounted on the top surface 101$b$ of the base 101 via, for example, a bonding member, such as an adhesive or solder, may be welded, may be attached via a fixture, such as a screw, or may be integrated with the base 101. The adhesive may be an electromagnetic wave curable adhesive or a thermosetting adhesive, and it is preferable that the adhesive has relatively high thermal conductivity.

Further, in the present embodiment, the shielding unit 101$d$1 includes reflecting surfaces 101$da$ on an end portion in the X1 direction and an end portion in the X2 direction. The reflecting surfaces 101$da$ are inclined such that reflected light Lsr does not return to (come into contact with) the optical components, such as the mirror 103 and the lenses 41A to 43A, but deviate to an opposite side of the top surface 101$b$ of the base 101 with respect to the optical components. The stray light Ls that travels in the X1 direction is reflected by the reflecting surface 101$da$ on the end portion of the shielding unit 101$d$1 in the X2 direction toward a direction between an opposite direction (X2 direction) of the X1 direction and the Z direction. In contrast, the stray light Ls that travels in the X2 direction is reflected by the reflecting surface 101$da$ on the end portion of the shielding unit 101$d$1 in the X1 direction toward a direction between the opposite direction (the X1 direction) of the X2 direction and the Z direction.

Furthermore, the reflecting surfaces 101$da$ are coated with, for example, a black paint or the like that converts energy of the laser light to thermal energy. In this case, the reflecting surfaces 101$da$ function as absorbing surfaces that absorb energy of the laser light. The reflecting surfaces 101$da$ are one example of an absorbing surface. With this configuration, it is possible to further reduce intensity of the reflected light at the reflecting surfaces 101$da$, so that it is possible to prevent or reduce an adverse effect of the reflected light on a different region.

Moreover, the refrigerant passage 109 in which a refrigerant C flows is arranged in the base 101 so as to overlap with the shielding unit 101$d$1 in the Z direction. The refrigerant passage 109 is arranged such that a part of an interval between the inlet 109$a$ and the outlet 109$b$ of the refrigerant passage 109 passes through a position overlapping with the shielding unit 101$d$1 in the Z direction. In this interval, the refrigerant passage 109 extends along the shielding unit 101$d$1 in the Y direction, for example.

The shielding unit 101$d$1 and the base 101 are made of, for example, a material with high thermal conductivity, such as a copper material or an aluminum material, and the shielding unit 101$d$1, the inner surface of the refrigerant passage 109, and the refrigerant C are thermally connected via the base 101. Therefore, according to the present embodiment, heat exchange is performed between the refrigerant C and the shielding unit 101$d$1 via the base 101, and the shielding unit 101$d$1 in which heat is generated heat based on the energy of the stray light Ls is cooled, so that it is possible to prevent an increase in temperature of the shielding unit 101d1 and around the shielding unit 101d1.

Figure 5:
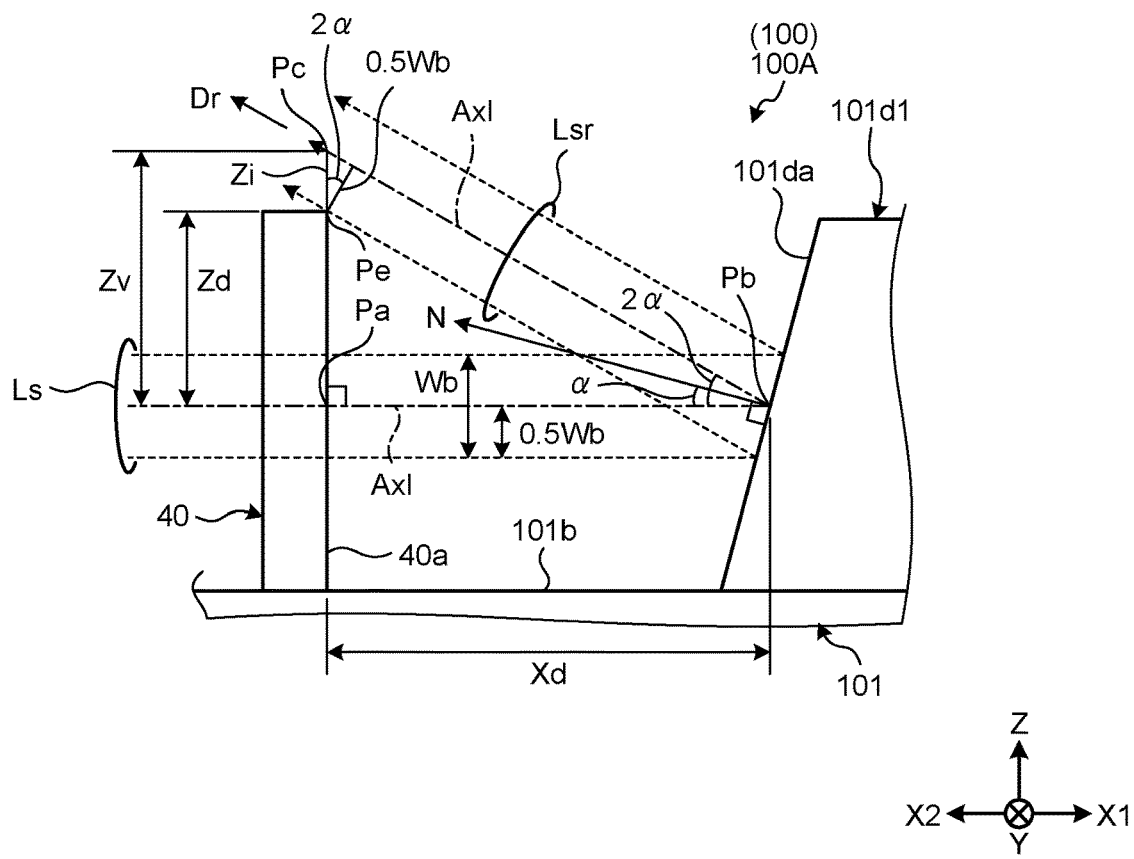
FIG. 5 is an exemplary and schematic side view of a part including the shielding unit and an optical component of the optical apparatus of the first embodiment.

FIG. 5 is a side view of the shielding unit 101d1 and an optical component 40 corresponding to the subunit 100a1 of the array A1 viewed in the Y direction. The optical component 40 is an optical component that is included in the subunit 100a1 of the array A1, and any one of the lenses 41A to 43A and the mirror 103.

In FIG. 5, an end portion of the reflected light Lsr, which is reflected at the reflecting surface 101da of the shielding unit 101d1 with respect to the stray light Ls that travels from the array A1 in the X1 direction, at the side of the top surface 101b and an end portion of the optical component 40 in the Z direction at a facet 40a of the optical component 40 in the X1 direction overlap with each other at a point Pe. Therefore, if the reflected light Lsr is located on a more opposite side of the top surface 101b with respect to the optical component 40 as compared to the state in FIG. 5, the reflected light Lsr does not hit the optical component 40.

In FIG. 5, $\alpha$ represents an incident angle of the stray light Ls, which travels in the X1 direction, with respect to the reflecting surface 101da. The reflected light Lsr travels in a Dr direction between the X2 direction and the Z direction, and an elevation angle of the Dr direction with respect to the X2 direction is $2\alpha$. A beam width (diameter) of each of the stray light Ls and the reflected light Lsr is denoted by Wb. A point that is aligned with the point Pe in the Z direction on an optical axis Axl of the stray light Ls is denoted by Pa, and a point that is aligned with the point Pe in the Z direction on the optical axis Axl of the reflected light Lsr is denoted by Pc. Further, a distance between the point Pa and a point Pb in the X1 direction is denoted by Xd, a distance between the point Pa and the point Pe in the Z direction is denoted by Zd, a distance between the point Pa and the point Pc in the Z direction is denoted by Zv, and a distance between the point Pe and the point Pc is denoted by Zi. Furthermore, an N direction indicates a normal direction of the reflecting surface 101da at the point Pb. Meanwhile, the beam width may be set to, for example, a width of a region in which the intensity is equal to or larger than $1/e^2$ of the peak intensity or a width of a region in which the intensity is equal to or larger than a predetermined ratio of the peak intensity. Here, the predetermined ratio is, for example, equal to or larger than 0.1% and equal to or smaller than 1%. Moreover, the beam width Wb in a case where the laser light coming from the light emitting element is collimated by the collimator lens may be obtained by an equation of Wb=2×f×NA based on a focal distance f of the collimator lens and the number NA of openings of the collimator lens.

In this case, a triangle that connects the points Pa, Pb, and Pc is an isosceles right triangle, so that $Zv=Xd\times\tan(2\alpha)$. Further, $Zd=Zv-Zi$ and $Zi=0.5Wb\times\cos(2\alpha)$. Therefore, in the state illustrated in FIG. 5, $$Zd=Zv-Zi=Xd\times\tan(2\alpha)-0.5Wb\times\cos(2\alpha).$$

Consequently, to locate the reflected light Lsr at a position on a more opposite side of the top surface 101b with respect to the optical component 40 as compared to the state illustrated in FIG. 5, the following Expression (1) needs to be satisfied.

$$Xd\times\tan(2\alpha)-0.5\times Wb/\cos(2\alpha)>Zd \qquad (1)$$

In FIG. 5, the X1 direction is one example of a third direction, the Z direction is one example of a fourth direction, and the Dr direction is one example of a fifth direction. Furthermore, the point Pe is one example of an end point and the point Pb is one example of a reflection point. Meanwhile, the subunit 100a of the array A22 is configured so as to have a mirror image relationship with the configuration in FIG. 5. Therefore, if the condition of Expression (1) is satisfied for the subunit 100a2, it is possible to avoid interference between the reflected light Lsr and the optical component 40. However, with respect to the subunit 100a2, the X1 direction is one example of the third direction, the X2 direction is one example of an opposite direction of the third direction, the Z direction is one example of the fourth direction.

Thus, as described above, in the present embodiment, the shielding unit 101d1 blocks the stray light traveling in the X1 direction from the lenses 41A to 43A and the mirror 103 as the optical component 40 (the first optical component) of the subunit 100a1 to the lenses 41A to 43A and the mirror 103 as the optical component 40 (the second optical component) of the subunit 100a2, and reflects the stray light in a direction deviating from the optical component 40 (the first optical component) of the subunit 100a1. Furthermore, the shielding unit 101d1 blocks the stray light traveling in the X2 direction from the lenses 41A to 43A and the mirror 103 of the subunit 100a2 to the lenses 41A to 43A and the mirror 103 of the subunit 100a1, and reflects the stray light in a direction deviating from the optical component 40 of the subunit 100a2.

With this configuration, for example, it is possible to prevent interference of the stray light coming from the first optical component with the laser light that is transmitted by the second optical component or prevent a disadvantageous situation in which the bonding members of the first optical component and the second optical component are damaged by the stray light.

Furthermore, as in the present embodiment, the shielding unit 101d1 may reflect the stray light in a direction away from the base 101. If the stray light is reflected in a direction approaching the base 101, a disadvantageous situation may occur due to secondary reflected light of the reflected light at the base 101. In this regard, if the shielding unit 101d1 reflects the stray light in the direction away from the base 101 as in the present embodiment, it is possible to easily prevent a disadvantageous situation due to the secondary reflected light at the base 101, for example.

Moreover, as in the present embodiment, the shielding unit 101d1 may reflect and absorb the stray light. With this configuration, for example, it is possible to reduce the intensity of the reflected light of the stray light at the shielding unit 101d1, so that it is possible to further prevent a disadvantageous situation due to the reflected light.

Furthermore, as in the present embodiment, the shielding unit 101d1 may be located between the subunit 100a1 and the subunit 100a2. With this configuration, for example, it is possible to share the shielding unit 101d1 between the subunits 100a1 and 100a2, so that it is possible to reduce the number of components and reduce time and cost for manufacturing the optical apparatus 100A or it is possible to achieve a compact configuration of the optical apparatus 100A, as compared to the configuration in which the shielding unit 101d1 is arranged for each of the the subunits 100a1 and 100a2.

Figure 6:
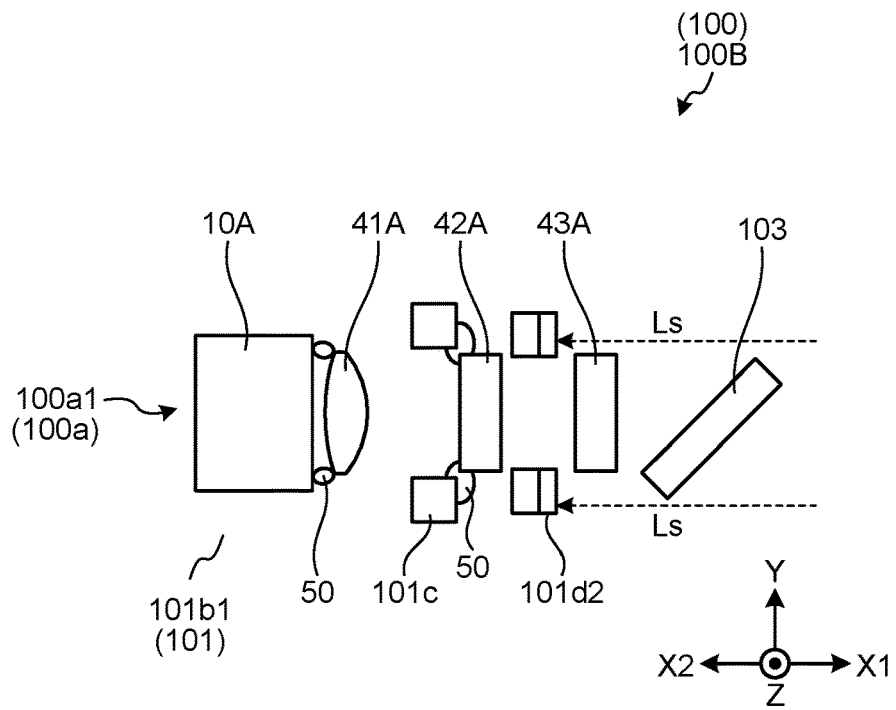
FIG. 6 is an exemplary and schematic plan view of a part of an optical apparatus of a second embodiment.

FIG. 6 is a plan view of the subunit 100a1 (100a) that is included in an optical apparatus 100B (100) of a second embodiment. The optical apparatus 100B has the same configuration as the optical apparatus 100A of the first embodiment except that the subunit 100a illustrated in FIG. 6 is arranged instead of the subunit 100a illustrated in FIG. 1. Meanwhile, the subunit 100a1 of the array A1 is illustrated in FIG. 6, but the subunit 100a of the array A22 has the same configuration as FIG. 6, that is, a configuration in a mirror image relationship with the configuration in FIG. 6.

As illustrated in FIG. 6, the lens 41A is bonded on the light emitting module 10A via a bonding unit 50. Further, the lens 42A is bonded on posts 101c via the bonding unit 50. The light emitting module 10A and the posts 101c are examples of a protruding portion that protrudes from the top surface 101b of the base 101 in the Z direction. Furthermore, the bonding unit 50 is one example of a bonding member.

The posts 101c may be attached onto the top surface 101b of the base 101 via a bonding member, such as an adhesive or solder, may be welded, may be attached via a fixture, such as a screw, or may be integrated with the base 101, for example. The adhesive of the posts 101c may be an electromagnetic wave curable adhesive or a thermosetting adhesive. Meanwhile, the posts 101c are arranged on both sides of the lens 42A in the Y direction, but may be arranged on only one side.

Moreover, the bonding unit 50 is an adhesive that is made of, for example, a synthetic resin material. The bonding unit 50 may be an electromagnetic wave curable adhesive or a thermosetting adhesive.

Furthermore, in the present embodiment, shielding units 101d2 that block stray light Ls traveling toward the bonding unit 50 are arranged at positions separated from the bonding unit 50 in the X1 direction. With this configuration, the stray light Ls coming from the subunit 100a that is included in the other one of the arrays A1 and A2 is applied to the bonding unit 50 that is included in the subunit 100a of one of the arrays A1 and A2, so that it is possible to prevent a damage of the bonding unit 50. According to the present embodiment, for example, it is possible to implement the shielding units 101d2 with a relatively compact configuration. Meanwhile, if the optical apparatus 100B further includes the shielding unit 101d1 of the first embodiment as described above, for example, it is possible to more reliably prevent a disadvantageous situation due to the stray light Ls, which is an advantage. Furthermore, if the optical apparatus 100B does not include the shielding unit 101d1 of the first embodiment as described above, for example, it is possible to configure the optical apparatus 100B with reduced weight, which is an advantage.

Figure 7:
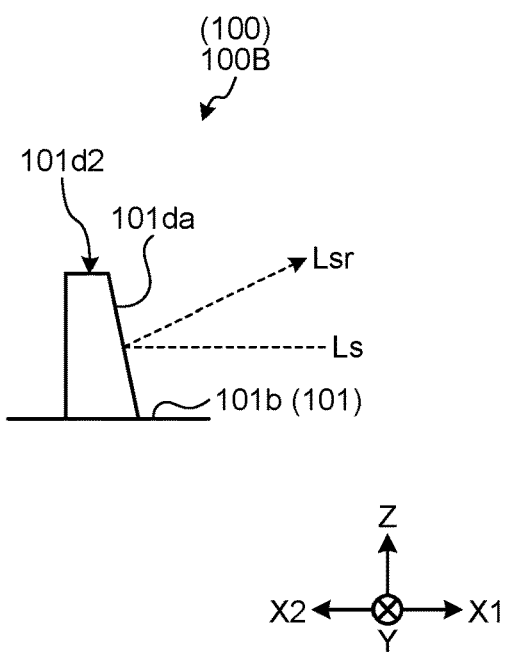
FIG. 7 is an exemplary and schematic side view of a shielding unit included in the optical apparatus of the second embodiment.

FIG. 7 is a side view of the shielding unit 101d2. As illustrated in FIG. 7, even in the present embodiment, the shielding unit 101d2 includes the same reflecting surface 101da as the first embodiment as described above. A reflection direction of the stray light Ls reflected by the reflecting surface 101da is the same as the first embodiment as described above. With this configuration, it is possible to easily avoid a disadvantageous situation due to the reflected light Lsr coming from the reflecting surface 101da. Meanwhile, the shielding unit 101d2 may also function as the absorbing unit similarly to the first embodiment.

Even in the optical apparatus 100B of the second embodiment, with the shielding units 101d2, it is possible to achieve the same effect as the optical apparatus 100A of the first embodiment as described above.

Figure 8:
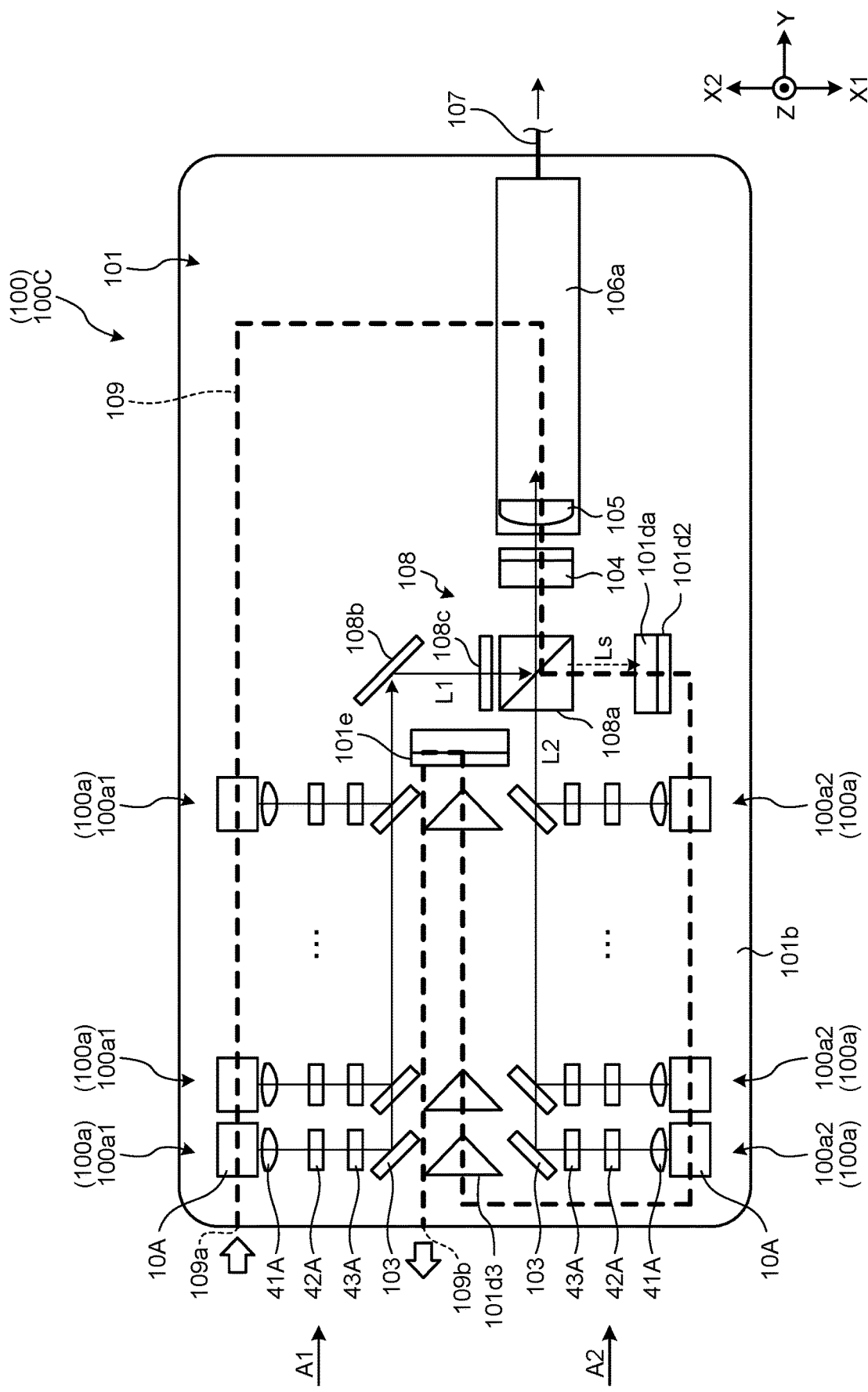
FIG. 8 is an exemplary and schematic plan view of an optical apparatus of a third embodiment.

FIG. 8 is a plan view of an optical apparatus 100C (100) of a third embodiment. The optical apparatus 100C has the same configuration as the optical apparatus 100A of the first embodiment except that a plurality of shielding units 101d3 as illustrated in FIG. 8 are arranged instead of the shielding unit 101d1 as illustrated in FIG. 1. Each of the shielding units 101d3 is arranged between the subunit 100a1 and the subunit 100a2. Further, similarly to the first embodiment, even in the present embodiment, each of the shielding units 101d3, the inner surface of the refrigerant passage 109, and the refrigerant are thermally connected via the base 101.

Figure 9:
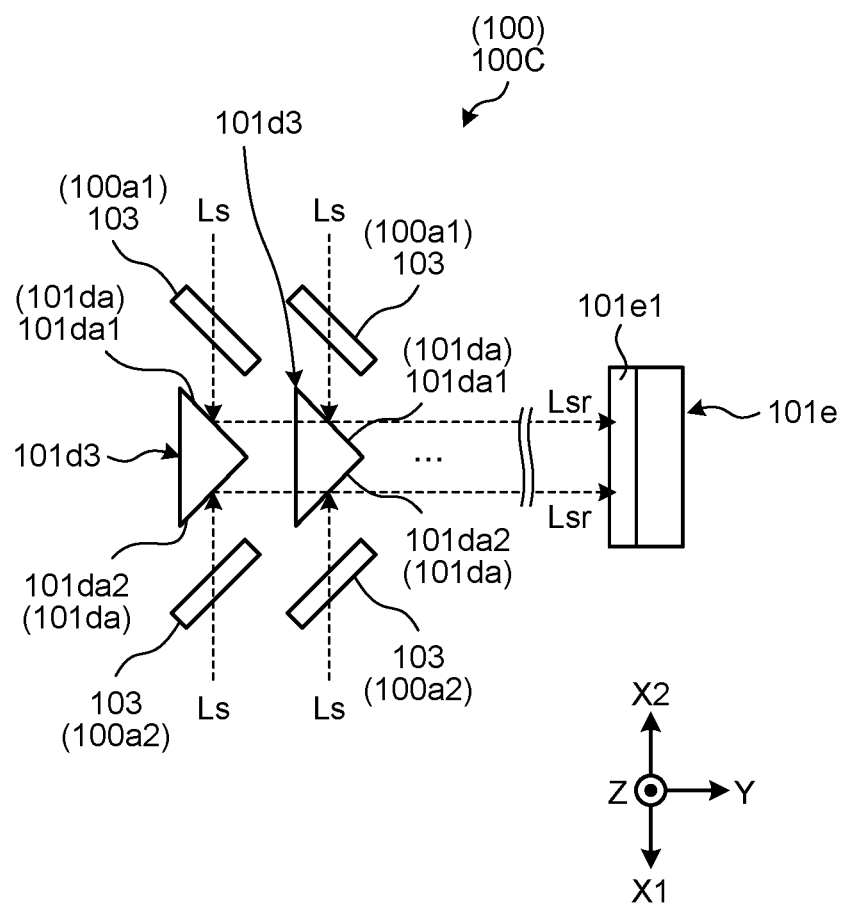
FIG. 9 is a partial enlarged view of FIG. 8.

FIG. 9 is an enlarged view of the shielding units 101d3, the mirror 103, and an absorbing unit 101e of the optical apparatus 100C illustrated in FIG. 8. As illustrated in FIG. 9, the shielding units 101d3 are able to block the stray light Ls traveling from the subunit 100a1 to the subunit 100a2 and the stray light Ls traveling from the subunit 100a2 to the subunit 100a1 similarly to the first embodiment as described above.

Further, each of the shielding units 101d3 includes two reflecting surfaces 101da. Each of reflecting surfaces 101da1 (101da) that correspond to the subunits 100a1 and that are located on end portions facing the subunits 100a1 in the X2 direction reflects, toward the Y direction, the stray light Ls that comes from the subunits 100a1. Furthermore, each of reflecting surfaces 101da2 (101da) that correspond to the subunits 100a2 and that are located on end portions facing the subunits 100a2 in the X1 direction reflects, toward the Y direction, the stray light Ls that comes from the subunit 100a2. Here, similarly to the first embodiment, the position of each of the subunits 100a in the Z direction is deviated in the opposite direction of the Z direction along the Y direction, and an end portion of each of the shielding units 101d3 in the Z direction is deviated in the opposite direction of the Z direction along the Y direction. Therefore, each reflected light Lsr is able to travel in the Y direction over each of the shielding units 101d3 in the Z direction. With this configuration, the beams of stray light Ls that travel from the respective subunits 100a1 in the X1 direction are reflected by the reflecting surfaces 101da1, and serve as the beams of reflected light Lsr that travel in the Y direction in a parallel manner in the Z direction and. Moreover, the beams of stray light Ls that travel from the respective subunits 100a2 in the X2 direction are reflected by the reflecting surfaces 101da2, and serve as the beams of reflected light Lsr that travel in the Y direction in a parallel manner in the Z direction. The reflecting surface 101da1 is one example of a first shielding unit, and the reflecting surface 101da2 is one example of a second shielding unit. Furthermore, the X1 direction is one example of the first direction, the X2 direction is one example of the opposite direction of the first direction, and the Y direction is one example of the second direction.

The reflected light Lsr that travels from the reflecting surface 101da1 and the reflecting surface 101da2 in the Y direction is input to a facet 101e1 of the absorbing unit 101e. The absorbing unit 101e protrudes from the top surface 101b of the base 101 in the Z direction. The facet 101e1 is coated with, for example, a black paint or the like that converts energy of the laser light to thermal energy. In this case, the facet 101e1 functions as an absorbing surface that absorbs energy of the laser light. The facet 101e1 may also be referred to as an absorbing surface. Furthermore, the facet 101e1 is inclined with respect to the Z direction such that even if the reflected light Lsr that is not absorbed by the facet 101e1 is reflected by the facet 101e1, the reflected light Lsr does not return to the shielding units 101d3 but travels in a direction between the opposite direction of the Y direction and the Z direction while traveling away from the top surface 101b of the base 101. In other words, the normal direction of the facet 101e1 has an elevation angle that is larger than 0° and smaller than 90° with respect to the opposite direction of the Y direction. Moreover, the refrigerant passage 109 arranged in the base 101 is arranged so as to partially overlap with the absorbing unit 101e in the Z direction, and the absorbing unit 101e, the inner surface of the refrigerant passage 109, and the refrigerant are thermally connected via the base 101.

According to the present embodiment, it is advantageous that the absorbing unit 101e corresponding to the reflected light Lsr is able to infallibly handle the reflected light Lsr, that is, the stray light Ls, for example. Furthermore, according to the present embodiment, it is possible to collectively handle the plurality of beams of reflected light Lsr by the absorbing unit 101e, so that it is advantageous that the number of components is reduced and the configuration of the optical apparatus 100C is simplified as compared to, for example, a case in which a plurality of absorbing units that handle the plurality of beams of the reflected light Lsr are arranged at a plurality of portions. Meanwhile, the absorbing unit 101e may be arranged for each of the arrays A1 and A2.

Moreover, the optical apparatus 100C of the present embodiments includes, as illustrated in FIG. 8, the shielding unit 101d2 corresponding to the combiner 108a. The shielding unit 101d2 protrudes from the top surface 101b of the base 101 in the Z direction, and is able to block the stray light Ls that travels in the X1 direction without being reflected in the Y direction in the laser light L1 that is input to the combiner 108a in the X1 direction, and the stray light Ls that is reflected and travels in the X1 direction without being transmitted in the Y direction in laser light L2 that is input to the combiner 108a in the Y direction. Furthermore, the shielding unit 101d2 includes the reflecting surface 101da that reflects the stray light Ls, which comes from the combiner 108a, toward a direction deviated from the optical components, such as the combiner 108a, the half-wave plate 108c, and the mirror 108b and a direction separated from the top surface 101b of the base 101. Moreover, the reflecting surface 101da is coated with, for example, a black paint or the like that converts energy of the laser light to thermal energy. In this case, the reflecting surface 101da functions as an absorbing surface that absorbs energy of the stray light Ls. The reflecting surface 101da is one example of the absorbing surface. Furthermore, the refrigerant passage 109 that is arranged on the base 101 is arranged so as to partially overlap with the shielding unit 101d2 in the Z direction, and the shielding unit 101d2, the inner surface of the refrigerant passage 109, and the refrigerant are thermally connected via the base 101. In this manner, the shielding unit 101d2 is able to handle the stray light Ls coming from a specific optical element, so that it is possible to prevent or reduce an adverse effect of the stray light Ls on a different region. The combiner 108a is one example of the optical element. The laser light L1 that is input from the array A1 to the combiner 108a is one example of first laser light, the X1 direction is one example of a sixth direction, and the Y direction is one example of a seventh direction. Moreover, the laser light L2 that is input from the array A2 to the combiner 108a is one example of second laser light.

Even in the optical apparatus 100C of the third embodiment, with the shielding units 101d3 and 101d2, it is possible to achieve the same effects as the optical apparatus 100A of the first embodiment as described above.

Figure 10:
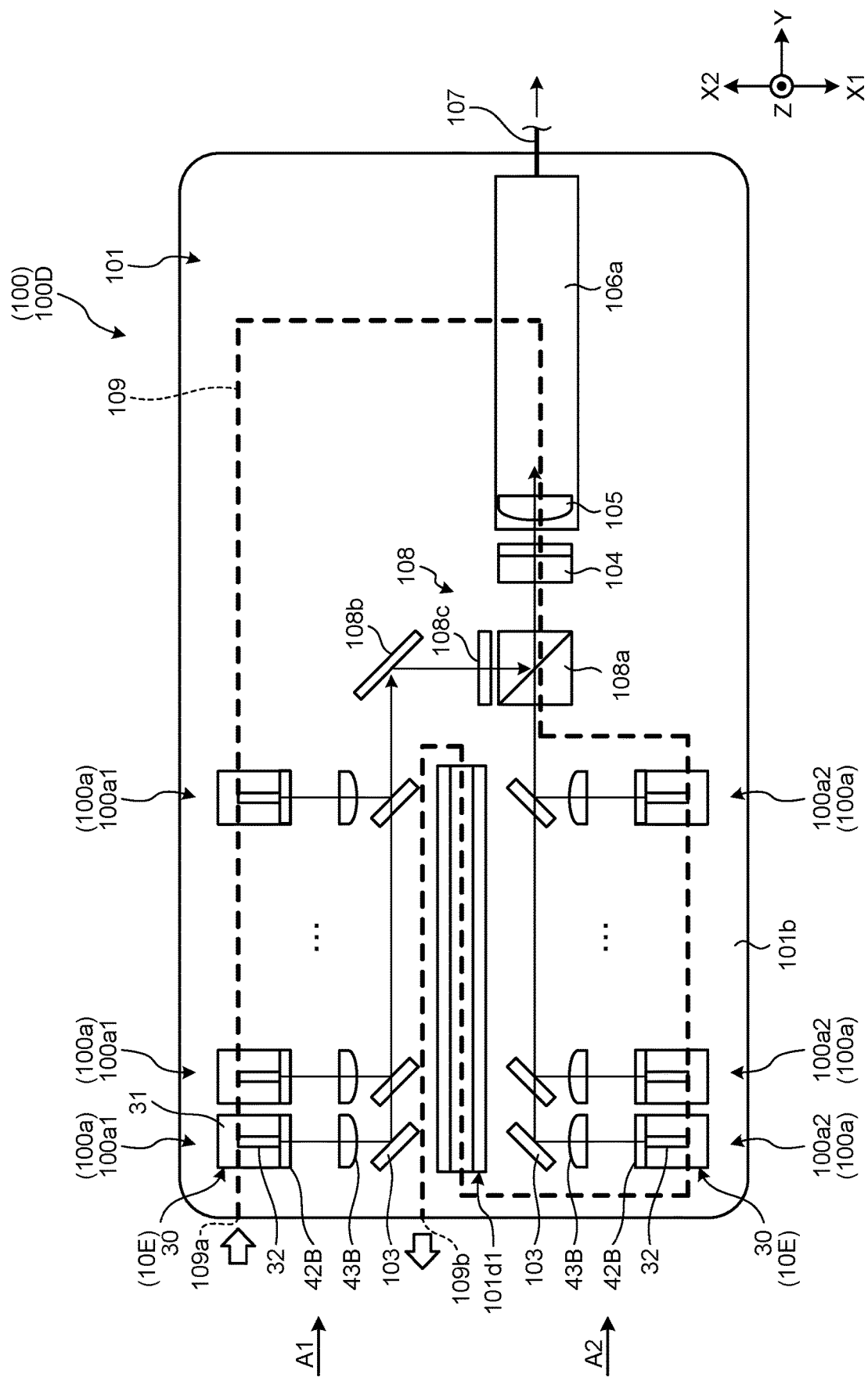
FIG. 10 is an exemplary and schematic plan view of an optical apparatus of a fourth embodiment.

FIG. 10 is a plan view of an optical apparatus 100D (100) of a fourth embodiment. The optical apparatus 100D has the same configuration as the optical apparatus 100A (100) of the first embodiment except that the optical component of the subunit 100a has a different configuration.

In the present embodiment, the subunit 100a includes a light emitting module 10E, a lens 42B, a lens 43B, and the mirror 103. The light emitting module 10E includes the chip-on-submount 30, but does not include the case 20. The chip-on-submount 30 is exposed inside an accommodation chamber of the optical apparatus 100D. The lens 42B collimates laser light coming from the light emitting element 32 in the Z direction, that is, in the fast axis. Further, the lens 43B collimates the laser light coming from the lens 42B in the Y direction, that is, in the slow axis.

Even in the optical apparatus 100D of the fourth embodiment, with the shielding unit 101d1, it is possible to achieve the same effects as the optical apparatus 100A of the first embodiment as described above.

Figure 11:
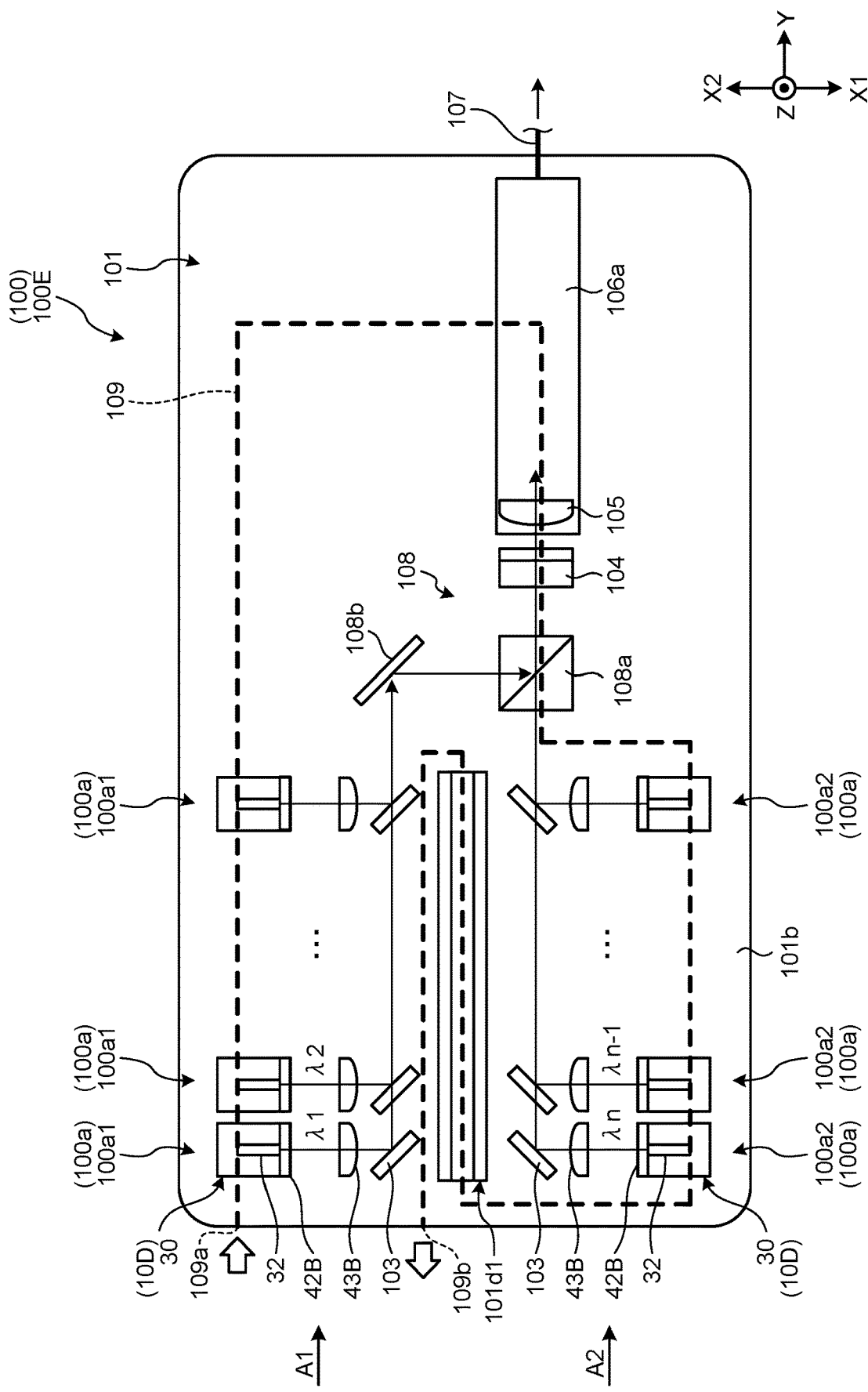
FIG. 11 is an exemplary and schematic plan view of an optical apparatus of a fifth embodiment.

FIG. 11 is a plan view of an optical apparatus 100E (100) of the fifth embodiment. The optical apparatus 100E has the same configuration as the optical apparatus 100D of the fourth embodiment as described above except that the plurality of light emitting elements 32 output beams of laser light at different wavelengths ($\lambda 1, \lambda 2, \ldots, \lambda n-1, \lambda n$) and the half-wave plate 108c is not included. As for an interval between the plurality of wavelengths, for example, the interval between center wavelengths is 5 nanometers (nm) to 20 nm. Further, synthetic light generated here may include blue laser light.

Even in the optical apparatus 100E of the fifth embodiment, with the shielding unit 101d1, it is possible to achieve the same effects as the optical apparatus 100A of the first embodiment as described above.

Figure 12:
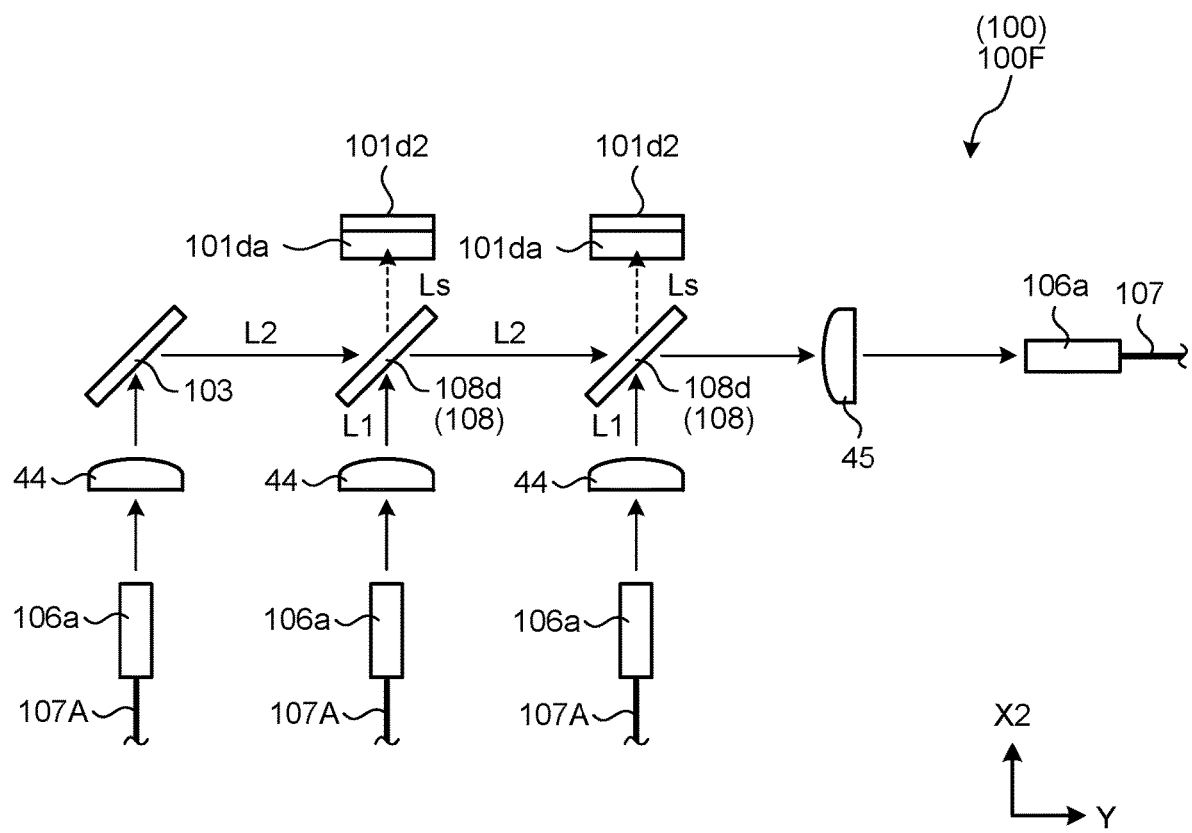
FIG. 12 is an exemplary and schematic plan view of an optical apparatus of a sixth embodiment.

FIG. 12 is a plan view of an optical apparatus 100F (100) of a sixth embodiment. The optical apparatus 100F includes a plurality of optical fibers 107A to which beams of laser light are input from outside, and does not include the light emitting module. The plurality of optical fibers 107A receive input of the beams of laser light at different wavelengths. Each of the optical fibers 107A is supported by the fiber support unit 106a. The optical apparatus 100F may also be referred to as a light synthesis apparatus.

The optical apparatus 100F includes lenses 44, the mirror 103, wavelength filters 108d, and a lens 45. Beams of laser light coming from the plurality of optical fibers 107A are transmitted to the end portion (not illustrated) of the optical fiber 107 via the lenses 44, the mirror 103, the wavelength filter 108d, and the lens 45, and optically coupled with the optical fiber 107. The lenses 44, the mirror 103, the wavelength filter 108d, and the lens 45 are examples of the optical component.

The mirror 103 reflects, toward the Y direction, the laser light that travels in the X2 direction. Further, the lenses 44 are, for example, collimator lenses, and the lens 45 is, for example, a condenser lens.

The wavelength filter 108d mainly reflects the laser light L1 traveling in the X2 direction, and transmits the laser light L2 traveling in the Y direction. Here, the X2 direction, the Y direction, and the posture of the wavelength filters 108d are set such that both of the reflected laser light and the transmitted laser light travel in the Y direction. In other words, the laser light (main light) that is output from the wavelength filter 108d and travels in the Y direction includes reflected light of the laser light L1 and transmitted light of the laser light L2. The wavelength filter 108d is one example of the optical element. The laser light L1 is one example of the first laser light, the X2 direction is one example of the sixth direction, and the Y direction is one example of the seventh direction. Further, the laser light L2 is one example of the second laser light.

The laser light L1 and the laser light L1 are beams of light at different wavelengths, for example. As one example, if the wavelength of the laser light L1 is longer than the wavelength of the laser light L2, the wavelength filters 108d are, for example, low-pass filters.

Further, the wavelength of the laser light L1 may be shorter than the wavelength of the laser light L2. In this case, the wavelength filters 108*d* are, for example, high-pass filters.

In the wavelength filters 108*d*, it is difficult to achieve reflection performance of 100% and transmission performance of 100%, and therefore, in reality, transmitted light of the laser light L1 and reflected light of the laser light L2 are generated, and these beams of light serve as the stray light Ls from the wavelength filters 108*d*. The stray light Ls travels from the wavelength filters 108*d* in the X2 direction.

To cope with this, the optical apparatus 100F includes shielding units 101*d*2 that block and reflect the stray light coming from the wavelength filters 108*d*. The shielding units 101*d*2 have the same configurations as the shielding units 101*d*2 that are arranged in the optical apparatus 100C of the third embodiment as described above. Therefore, even in the present embodiment, with the shielding units 101*d*2, it is possible to achieve the same effects as the optical apparatus 100C of the third embodiment as described above.

Figure 13:
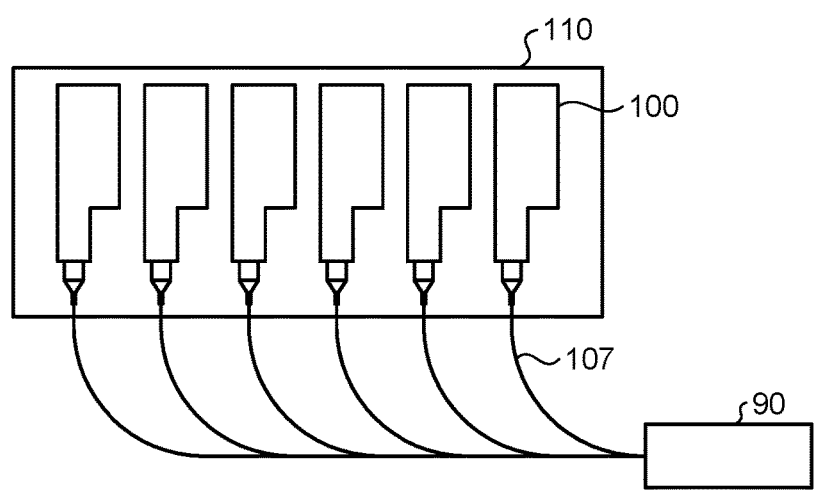
FIG. 13 is an exemplary schematic diagram of a light source apparatus of a seventh embodiment.

FIG. 13 is a configuration diagram of a light source apparatus 110 of a seventh embodiment in which the optical apparatus 100 (light emitting apparatus) of any of the first to the fifth embodiments is mounted. The light source apparatus 110 includes, as an excitation light source, the plurality of optical apparatuses 100. Laser light output from the plurality of optical apparatuses 100 are transmitted to a combiner 90 that is an optical coupler via the optical fibers 107. Output ends of the optical fibers 107 are connected to respective input ports of the combiner 90 that includes a plurality of input ports and a single output port. Meanwhile, the light source apparatus 110 need not always include the plurality of optical apparatuses 100, but it is sufficient to include at least the single optical apparatus 100. Further, the combiner 90 may be configured in the same manner as the optical apparatus 100F of the sixth embodiment as described above, and may include the shielding units 101*d*2.

Figure 14:
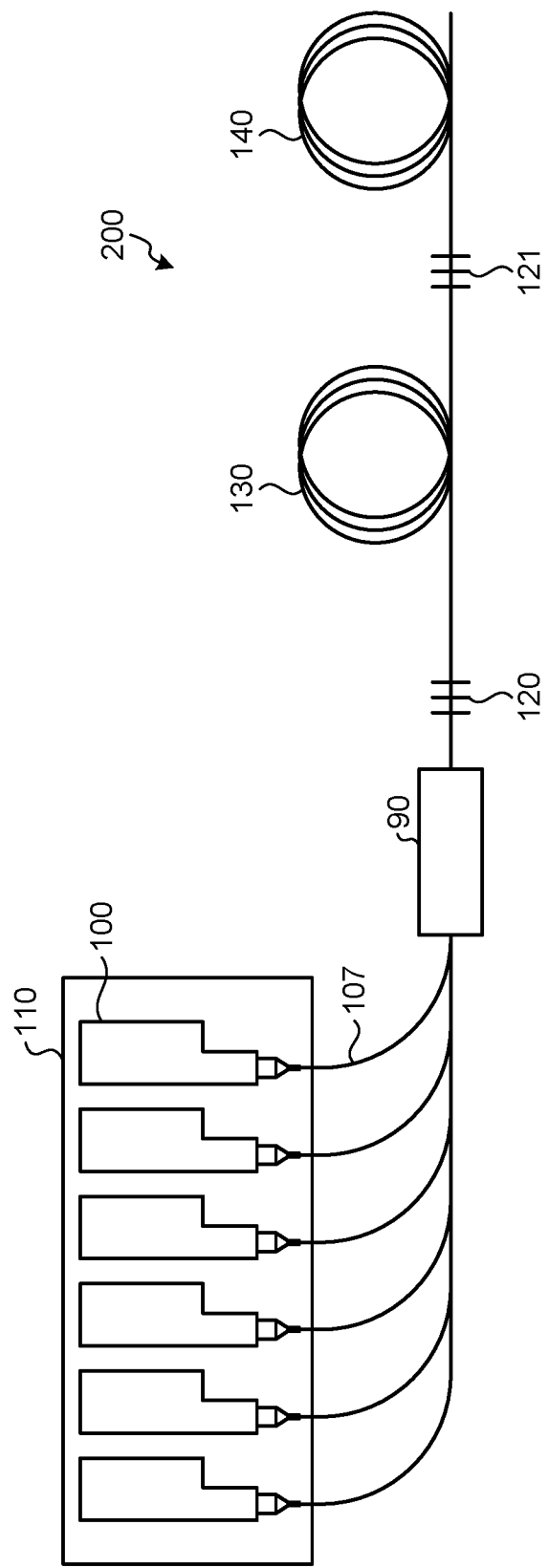
FIG. 14 is an exemplary schematic diagram of an optical fiber laser of an eighth embodiment.

FIG. 14 is a configuration diagram of an optical fiber laser 200 in which the light source apparatus 110 as illustrated in FIG. 13 is mounted. The optical fiber laser 200 includes the light source apparatus 110 and the combiner 90 as illustrated in FIG. 13, a rare-earth-added optical fiber 130, and an output-side optical fiber 140. High-reflection fiber bragg gratings (FBG) 120 and 121 are arranged on an input end and an output end of the rare-earth-added optical fiber 130.

The input end of the rare-earth-added optical fiber 130 is connected to an output end of the combiner 90, and an input end of the output-side optical fiber 140 is connected to the output end of the rare-earth-added optical fiber 130. Meanwhile, the input unit that inputs the laser light output from the plurality of optical apparatuses 100 to the rare-earth-added optical fiber 130 may be configured differently, instead of the combiner 90. For example, it may be possible to arrange, in a side-by-side manner, the optical fibers 107 at output portions of the plurality of optical apparatuses 100, and cause the laser light output from the plurality of optical fibers 107 to enter the input end of the rare-earth-added optical fiber 130 by using an input unit, such as an optical system, including a lens. The rare-earth-added optical fiber 130 is one example of an optical amplification fiber.

According to the light source apparatus 110 of the seventh embodiment or the optical fiber laser 200 of the eighth embodiment, the optical apparatus 100 of any of the first to the sixth embodiments is included, so that it is possible to achieve the same effects as the first to the sixth sixth embodiments.

Thus, while the embodiments have been described above, the embodiments as described above are examples and do not limit the scope of the disclosure. The embodiments as described above may be embodied in various different forms, and various omission, replacement, combination, and modifications may be made without departing from the gist of the disclosure. Furthermore, specifications of each of the configurations and shapes (structures, types, directions, models, sizes, lengths, widths, thicknesses, heights, numbers, arrangement, positions, materials, or the like) may be changed appropriately.

For example, the optical component is not limited to those disclosed in the embodiments, but a different optical element, such as a prism or a diffraction optical element, that reflects, refracts or diffracts light, may be adopted, for example. Meanwhile, the diffraction optical element is configured by, for example, compositing and integrating a plurality of diffraction grating with different cycles.

Furthermore, the configuration, arrangement, and combinations of the subunits, the light emitting module, each of the optical components, the protruding portion, the shielding unit, and the like are not limited to those of the embodiments as described above. Moreover, the traveling direction of the stray light is not limited to the directions as described above.

Figure 15:
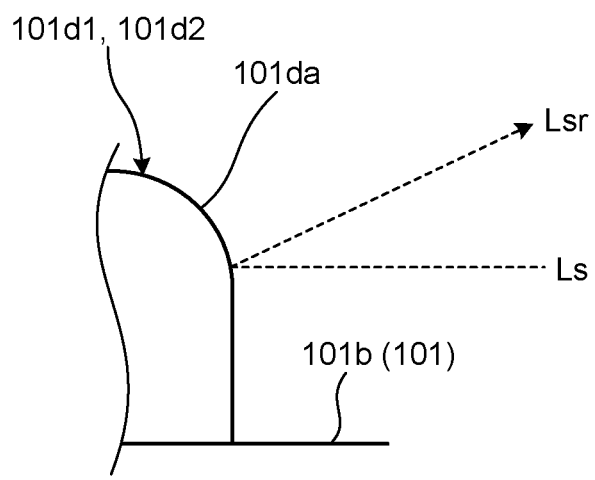
FIG. 15 is an exemplary and schematic side view of a shielding unit including an optical apparatus of a modification of the embodiments.

Furthermore, in the embodiments as described above, the reflecting surfaces 101*da* of the shielding units 101*d*1 and 101*d*2 have planar shapes as illustrated in FIG. 4 and FIG. 7, but embodiments are not limited to this example, and the reflecting surface 101*da* may have convex surface shapes as illustrated in FIG. 15, for example. Moreover, in a modification as illustrated in FIG. 15, the reflecting surface 101*da* has a curved surface shape in a region at which the stray light Ls hits, but embodiments are not limited to this example, and the reflecting surface 101*da* may have the curved surface shape in the entire region. Furthermore, the reflecting surface may have a concave surface shape.

According to the present disclosure, it is possible to achieve an optical apparatus, a light source apparatus, and an optical fiber laser with an improved and novel configuration that makes it possible to prevent an adverse effect due to stray light.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical apparatus comprising:
    a base;
    a light emitting element arranged on the base and configured to output laser light;
    a plurality of optical components arranged on the base and configured to
        guide the laser light output from the light emitting element to an optical fiber, and
        couple the laser light with the optical fiber; and
    a shielding unit arranged on the base and configured to
        block stray light deviated from a predetermined optical path in a first optical component as the optical component and traveling to a second optical component as the optical component, and
        reflect the stray light in a direction deviating from the first optical component, the end of the first optical component being positioned most distant from the base.

2. The optical apparatus according to claim 1, wherein the shielding unit is configured to reflect and absorb the stray light.

3. The optical apparatus according to claim 1, wherein
the first optical component is fixed to the base via a bonding member, and
the shielding unit is configured to block the stray light traveling toward the bonding member.

4. The optical apparatus according to claim 3, wherein the first optical component is fixed to a protruding portion protruding from a surface of the base via the bonding member.

5. The optical apparatus according to claim 1, further comprising:
a first subunit including at least one of the optical components configured to transmit laser light in a first direction; and
a second subunit including at least one of the optical components configured to transmit laser light in an opposite direction of the first direction, wherein
the shielding unit is configured to block and reflect at least one of the stray light traveling in the first direction from the first subunit and the stray light traveling in the opposite direction of the first direction from the second subunit.

6. The optical apparatus according to claim 5, wherein the shielding unit is configured to block and reflect both of the stray light traveling in the first direction from the first subunit and the stray light traveling in the opposite direction of the first direction from the second subunit.

7. The optical apparatus according to claim 5, wherein the shielding unit is located between the first subunit and the second subunit.

8. The optical apparatus according to claim 1, further comprising:
a plurality of first subunits each including at least one of the optical components configured to transmit laser light in a first direction;
a plurality of shielding units arranged so as to correspond to the respective first subunits, the plurality of shielding units serving as the shielding units configured to block the stray light traveling in the first direction, and reflect the stray light in a second direction; and
an absorbing unit configured to receive and absorb the stray light reflected by the plurality of shielding units.

9. The optical apparatus according to claim 1, further comprising:
a plurality of first units each including at least one of the optical components configured to transmit laser light in a first direction;
a plurality of first shielding units arranged so as to correspond to the respective first subunits and configured to block the stray light traveling in the first direction, and reflect the stray light in a second direction;
a plurality of second subunits each including at least one of the optical components configured to transmit laser light in an opposite direction of the first direction;
a plurality of second shielding units arranged so as to correspond to the respective second subunits, the plurality of second shielding units serving as a plurality of shielding units configure to block the stray light traveling in the opposite direction of the first direction and reflect the stray light in the second direction; and
an absorbing unit configured to receive and absorb light traveling from the plurality of first shielding units and the plurality of second shielding units.

10. The optical apparatus according to claim 1, wherein
the shielding unit includes a reflecting surface configured to reflect the stray light traveling in a third direction toward a fifth direction between an opposite direction of the third direction and a fourth direction perpendicular to the third direction,
the optical component includes an end point separated from the reflecting surface in the opposite direction of the third direction, protruding from the surface of the base in the fourth direction, and serving as an end portion in the fourth direction at a facet in the third direction, and
Expression (1) below is satisfied $$Xd \times \tan(2\alpha) - 0.5 \times Wb/\cos(2\alpha) > Zd \qquad (1),$$

where Xd is a distance between the end point and a reflection point in the third direction, the reflection point being located at a position on an optical axis of the stray light at the reflecting surface, Zd is a distance between the optical axis and the end point in the fourth direction, $\alpha$ is an incident angle of the stray light with respect to the reflecting surface, and Wb is a beam width of the stray light.

11. The optical apparatus according to claim 1, wherein
a cooling passage in which a refrigerant passes is arranged in the base, and
the shielding unit is thermally connected to the refrigerant via the base.

12. The optical apparatus according to claim 1, further comprising:
an optical element, as the optical component, configured to
reflect first laser light traveling in a sixth direction toward a seventh direction, and
reflect second laser light traveling in the seventh direction, wherein
the stray light coming from the optical element includes at least one of stray light of the first laser light traveling in the sixth direction from the optical element without being reflected by the optical element and stray light of the second laser light traveling in the sixth direction from the optical element without being transmitted through the optical element, and
the shielding unit is located separately from the optical element in the sixth direction.

13. A light source apparatus comprising:
the optical apparatus according to claim 1.

14. An optical fiber laser comprising:
the light sources apparatus according to claim 13; and
a light amplification fiber configured to amplify laser light emitted from the light source apparatus.

15. An optical apparatus comprising:
a base;
a plurality of optical components arranged on the base and configured to:
guide laser light to an optical fiber, and
couple the laser light with the optical fiber; and
a shielding unit arranged on the base and configured to;
block stray light that has deviated from a predetermined optical path in a first optical component included in the plurality of optical components, and
reflect the stray light in a direction away from an end of the first optical component, the end of the first optical component being positioned most distant from the base.

16. The optical apparatus according to claim 15, further comprising:

a base including a surface on which the plurality of optical components are arranged, and the shielding unit configured to protrude from the surface and reflect the stray light in a direction away from the surface.

17. The optical apparatus according to claim 15, further comprising:

an optical element, as the optical component, configured to reflect first laser light traveling in a sixth direction toward a seventh direction, and reflect second laser light traveling in the seventh direction, wherein the stray light coming from the optical element includes at least one of stray light of the first laser light traveling in the sixth direction from the optical element without being reflected by the optical element and stray light of the second laser light traveling in the sixth direction from the optical element without being transmitted through the optical element, and the shielding unit is located separately from the optical element in the sixth direction.

\* \* \* \* \*